Jan. 4, 1949.　　　　F. S. POORMAN　　　　2,457,832
AIRCRAFT GUNNERY PRACTICE RANGE
Filed June 2, 1945　　　　　　　　　　7 Sheets-Sheet 1
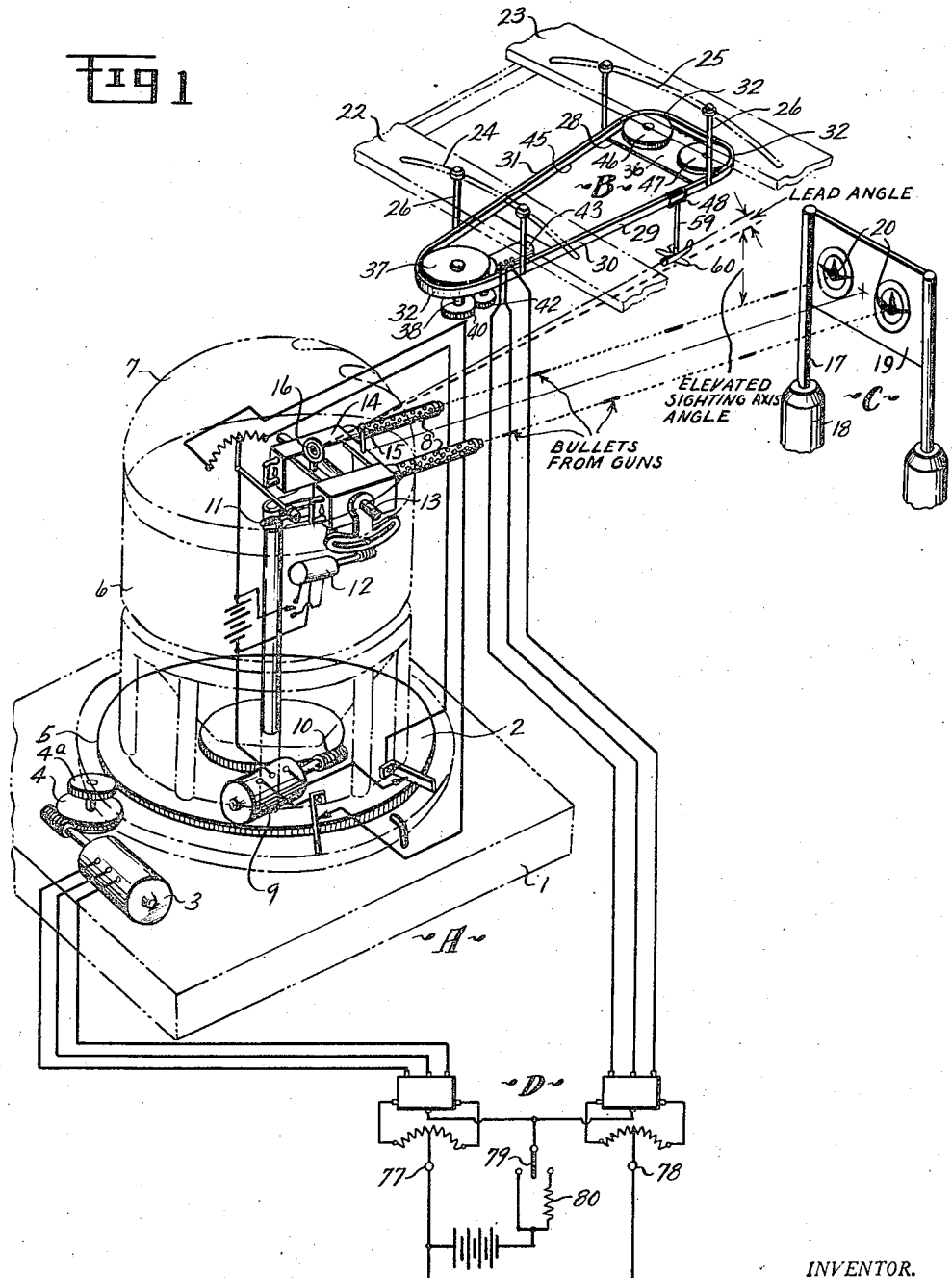
INVENTOR.
FRED S. POORMAN
BY
ATTORNEYS

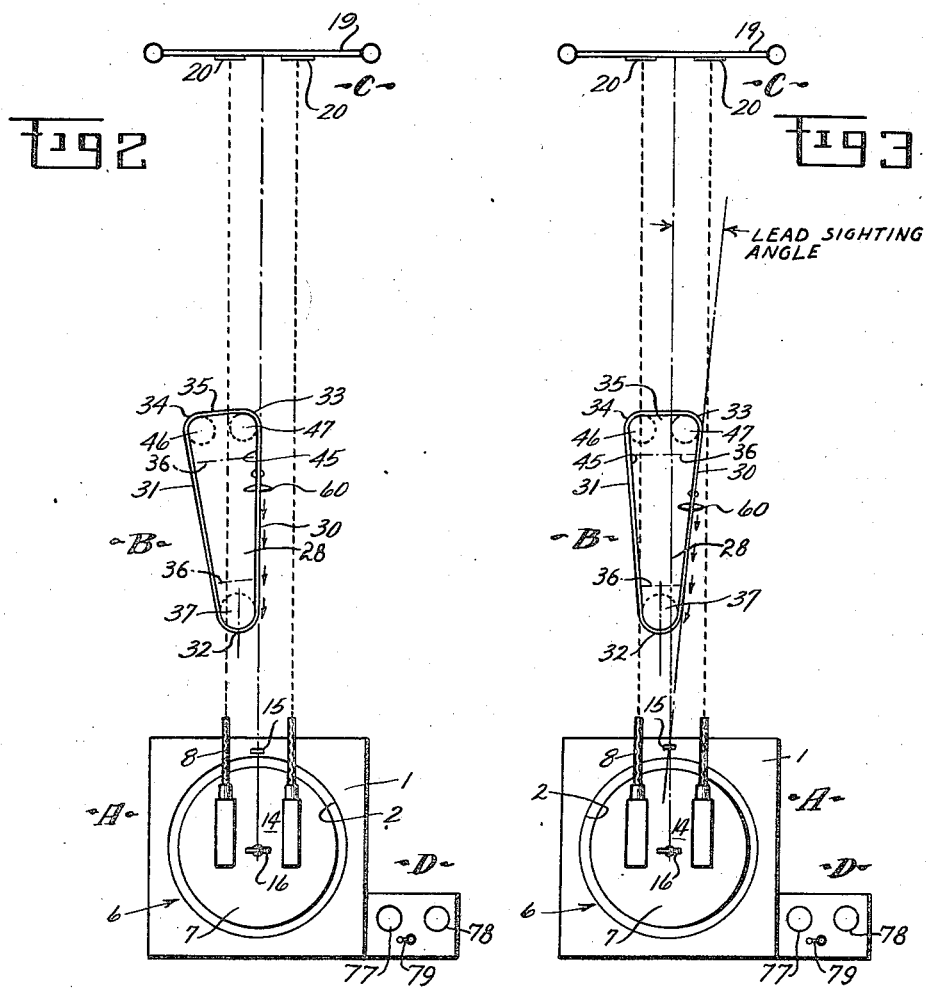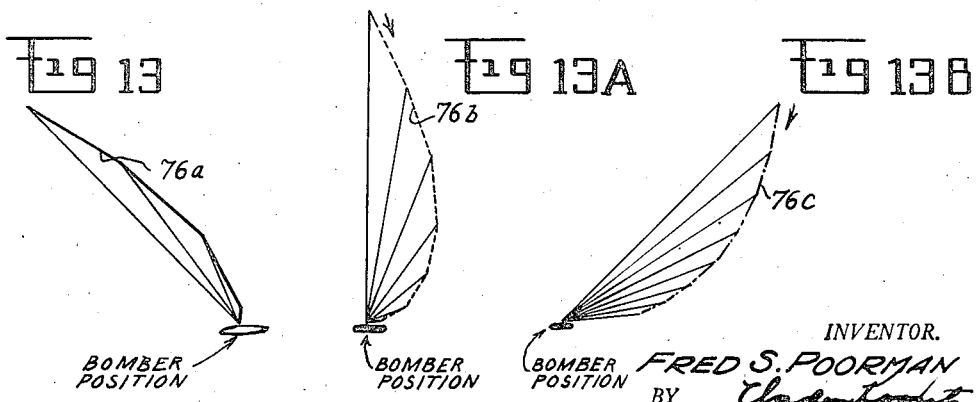

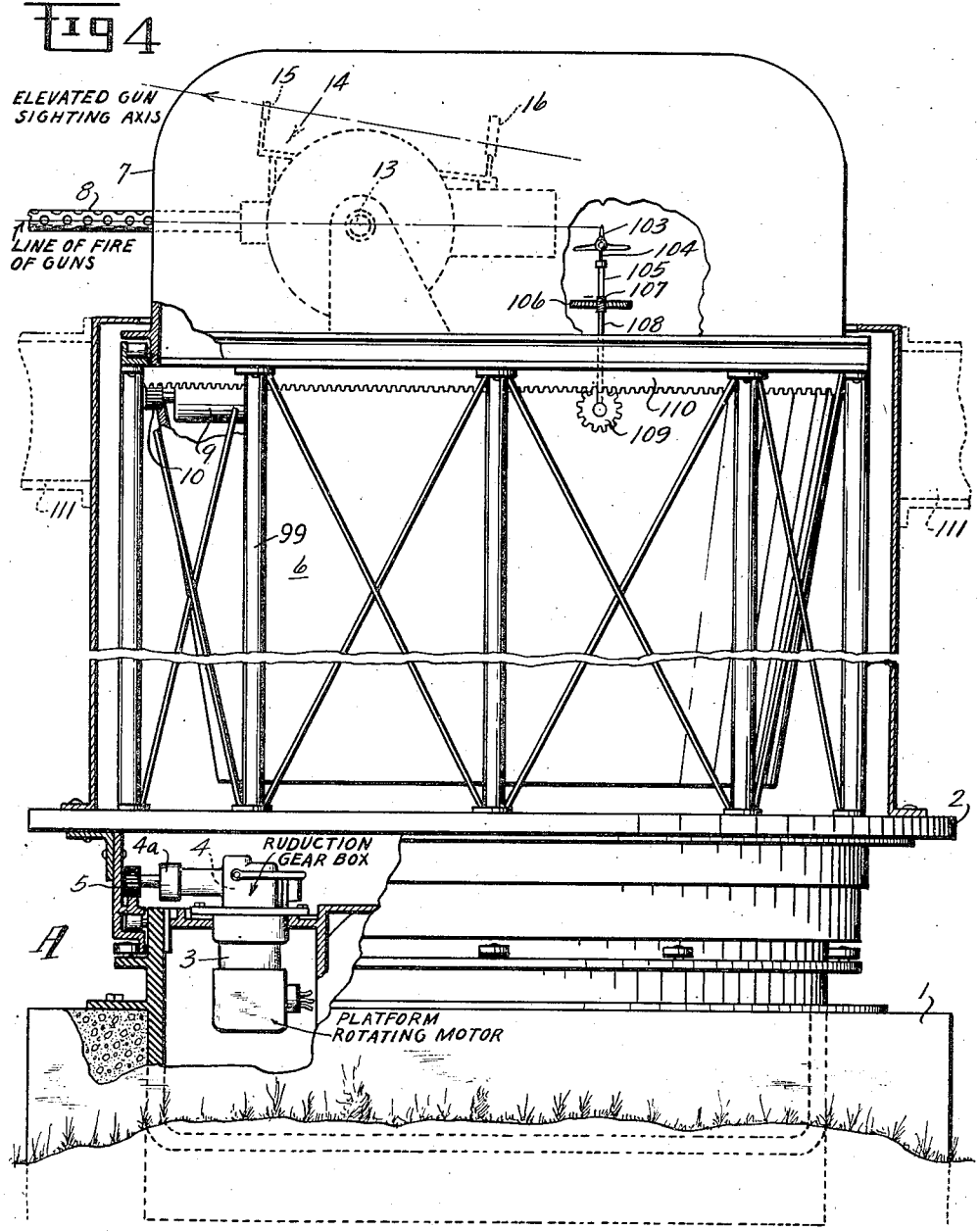

Jan. 4, 1949.  F. S. POORMAN  2,457,832
AIRCRAFT GUNNERY PRACTICE RANGE
Filed June 2, 1945  7 Sheets-Sheet 4

INVENTOR.
FRED S. POORMAN
BY
ATTORNEYS

Jan. 4, 1949.　　　　F. S. POORMAN　　　　2,457,832
AIRCRAFT GUNNERY PRACTICE RANGE
Filed June 2, 1945　　　　　　　　　　7 Sheets-Sheet 5
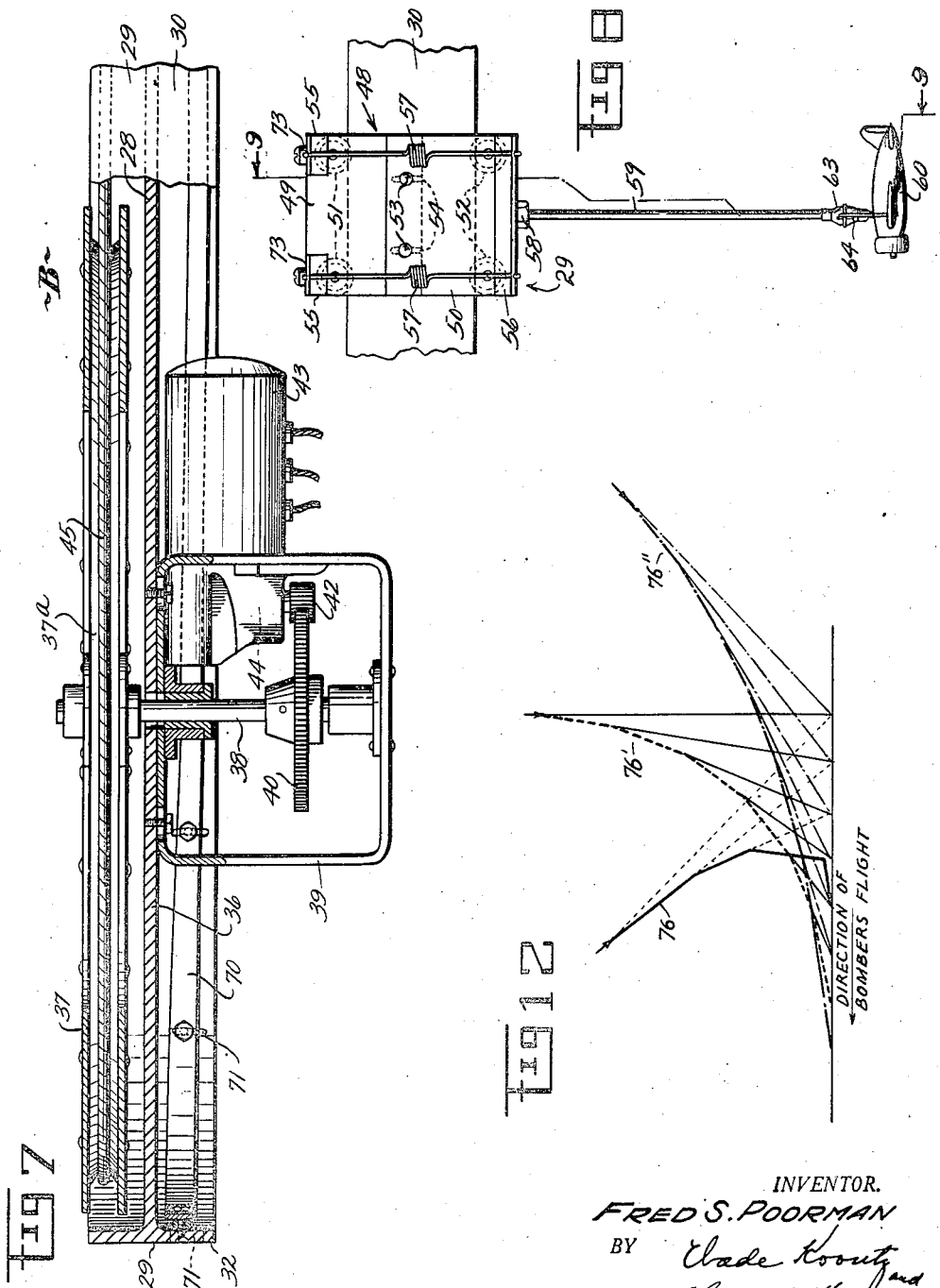
INVENTOR.
FRED S. POORMAN
BY Clade Koontz
and Charles H. Wagner
ATTORNEYS Jan. 4, 1949.  F. S. POORMAN  2,457,832
AIRCRAFT GUNNERY PRACTICE RANGE
Filed June 2, 1945  7 Sheets-Sheet 6
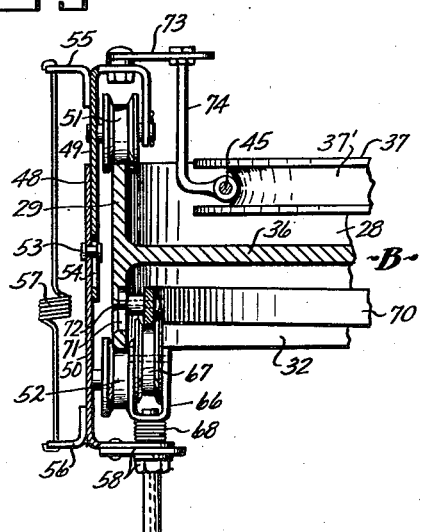
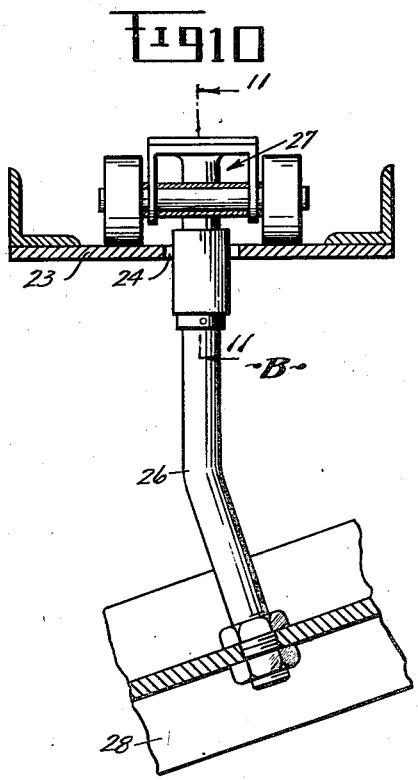
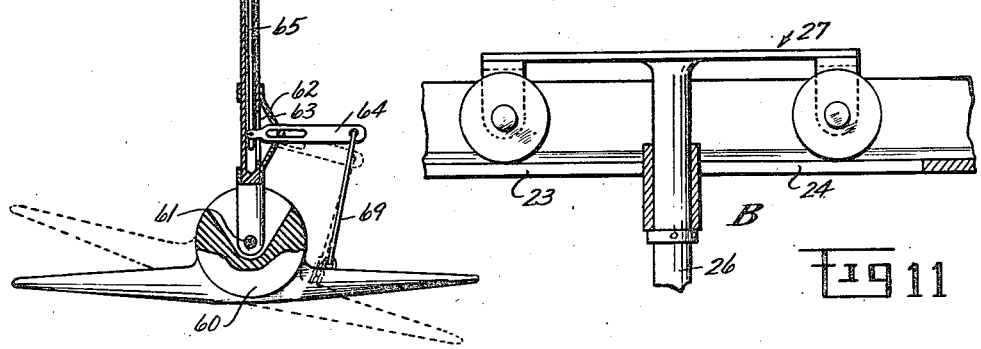
INVENTOR.
FRED S. POORMAN
BY
ATTORNEYS

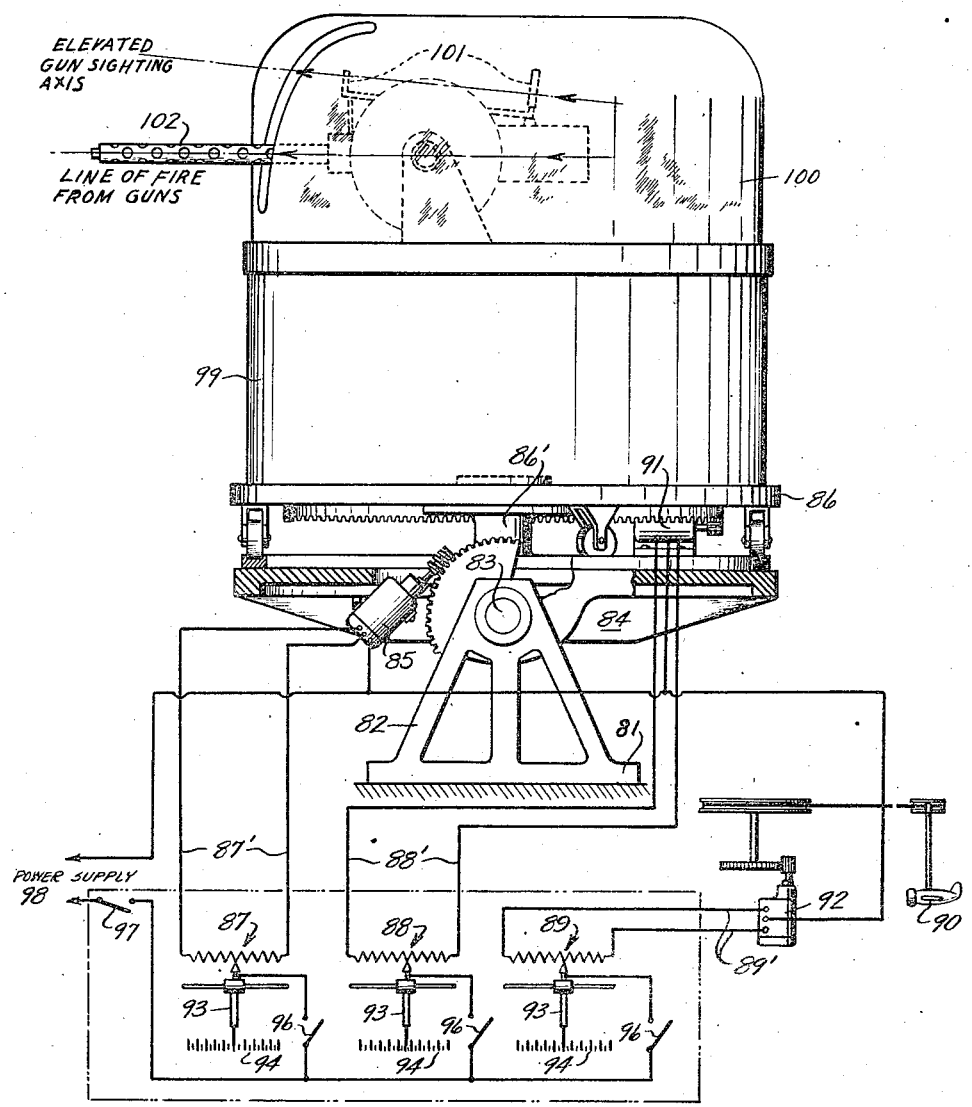

Patented Jan. 4, 1949

2,457,832

UNITED STATES PATENT OFFICE 2,457,832

AIRCRAFT GUNNERY PRACTICE RANGE

Fred S. Poorman, Washington, D. C.

Application June 2, 1945, Serial No. 597,292

17 Claims. (Cl. 35—25)

(Granted under the act of March 3, 1883, as amended April 30, 1928; 370 O. G. 757)

The invention described herein may be manufactured and used by or for the Government for governmental purposes without payment to me of any royalty thereon.

This invention relates to improvements in gunnery practicing apparatus and more particularly to aircraft gunnery practice apparatus for simulating actual flight and sighting conditions between two aircrafts in flight.

An object of the present invention is the provision of apparatus for simulating realistic aircraft target practice to teach the manipulation of aircraft turrets and guns therein with respect to an enemy plane on a predetermined approach or pursuit curve with respect to the turret, corresponding to actual combat maneuvers between a bomber or other aircraft carrying a turret and the enemy target or pursuit plane.

A further object of the invention is the provision of means for variably controlling the bodily rotation of the turret on its support, and the movement of a sighting target plane with respect to the axis of rotation of the turret, for simulating all types of pursuit approach curves between the pursuit plane simulated by the target plane, and the turret carrying plane simulated by the rotary support, between angles of 90° and 270° in azimuth with respect to the longitudinal axis of a bomber, and also simulating a head-on approach, together with means for recording the accuracy of the fire of the turret guns on a fixed or stationary scoring target, located in a different plane from that of the movable sighting target.

A further object is the provision of an aircraft gunnery practice range for conventional turret mounted aircraft guns, for simulating relative approach or pursuit curves between a simulated bomber carrying the turret mount and a movable sighting target representing an attacking pursuit plane, utilizing actual gun fire from the guns in the turret to record the bullet dispersement on an independent stationary target, thereby reducing the amount of space required for the aircraft gunnery practice target range to a minimum as compared to the conventional aircraft gunnery range employing the "jeep" or carriage mounted type of sighting and scoring target.

A still further object of the invention is the provision of an aircraft gunnery range practice apparatus for simulating actual bodily approach movements between a bomber having a conventional turret rotatably supported thereon and an enemy pursuit aircraft approaching the bomber on a pursuit curve during actual attacking battle conditions, together with regulatable power means for rotating the simulated bomber a rotary platform carrying the turret about the turret axis and separate regulatable power means for moving the sighting target or model pursuit plane toward the turret axis in the predetermined inclined adjusted plane of the sights for the guns within the turret, out of the line of fire from the turret guns, the miniature sighting target plane being also employed to teach recognition of types of approaching aircraft, in combination with a separate stationary scoring target disposed in the line of fire of the turret guns when the miniature target plane is in proper sighting alignment with the adjusted sights of the turret guns to record the gunner's accuracy by the gun fire of the guns on the stationary scoring target in direct ratio to the gunner's accuracy in sighting on the sighting target.

A further object is the provision of means for adjusting the azimuth angle or direction of movement of the sighting target plane toward the turret axis with respect to a line from the turret axis to the stationary scoring target to offset the direction of movement of the sighting target toward the turret with respect to the line of fire from the guns to the scoring target so as to incorporate problems of variations in lead in the sighting and fighting firing of the guns for different approach pursuit curves that are simulated by different rates of movement of the target plane, in conjunction with different rotative speeds of the platform.

A still further object is the provision of separate adjustably-controlled power means for variably rotating the support on which the turret is concentrically mounted with respect to the plane or direction of movement of the sighting target plane toward the turret axis, to effect changes in the relative angular relation between the guns and sighting means in the turret, and the position of the sighting target plane, and for moving the sighting target plane toward the turret at relatively different rates of speed during the rotation of the turret mounting means.

A still further object is the provision of rotary turret mounting means for conventional aircraft turrets having an associated instructor's control station and power means for rotating the turret mounting means independently of turret rotation by a gunner therein, and supplemental means for adjustably tilting the axis of the turret mounting means with respect to the plane of movement of the miniature target sighting plane toward the turret axis to simulate vertical movements or variations in altitude between two approaching planes, and a stationary scoring target mounted in a horizontal plane below the gun sighting axis when the sighting axis is maintained on the target plane, for recording the gunner's accuracy in aiming the guns when the turret guns are fired while the gun sighting means trained on the sighting target plane.

A still further object of the invention is the provision of gunnery range instructor's control means at the control station for imparting rotation to the turret supporting base at will, at predetermined constant or variable speeds and separate control means operable by the gunnery range instructor at the control station to impart movement to the miniature target sighting plane toward the turret at predetermined constant, or variable speeds, and a stationary scoring target positioned below the sighting axis of the turret guns when aimed at the sighting target for recording accuracy of the turret gunner as indicated by the bullet dispersement from the turret guns on the scoring target, whereby the instructor may observe the accuracy or proficiency of the gunner in his turret and gun manipulation and be in a position to instruct him and correct incorrect manipulation of the turret azimuth rotation controls in aiming the guns and firing the same during the simulated attack of the enemy target plane on the rotary support or simulating the bomber carrying the turret.

Other objects and advantages of the invention will become apparent from the following description taken in connection with the accompanying drawings in which like reference characters refer to like parts in the several figures thereof.

Fig. 1 is a diagrammatic perspective view of my improved aircraft turret gunnery practice range including a schematic wiring diagram for the operational control circuits.

Fig. 2 is a plan view diagrammatically illustrating the sighting target support or guide frame, adjusted to cause movement of the target plane with respect to the turntable axis for one type of simulated attack or pursuit curve of an enemy aircraft such as a rear or front attack on the bomber.

Fig. 3 is a view similar to Fig. 2 but showing the sighting target support or guide frame adjusted laterally to cause movement of the target plane with respect to the turntable axis for a different type of simulated attack or pursuit curve of an enemy aircraft such as an azimuth angle attack and introducing a problem of calculating the necessary "lead" in aiming at the sighting target.

Fig. 4 is an enlarged side elevation of the rotary turntable or gun turret support, parts being broken away and shown in section, and disclosing a conventional type of aircraft turret supporting structure mounted on the platform having a directable gun mount or turret independently rotatable on the turntable.

Fig. 7 is an enlarged fragmentary detail sectional view through the inner or turret end of the sighting target carrying frame, showing the sighting target cable drive details.

Fig. 8 is a side elevation of the sighting target carriage showing the same on a straight portion of the guide track of the guide frame.

Fig. 9 is an enlarged vertical sectional view taken approximately on the plane indicated by the line 9—9 in Fig. 8.

Fig. 10 is an enlarged detail view of one of the adjusting roller mounts for the sighting target guide frame, showing the supporting channel and a portion of the guide frame in section.

Fig. 11 is a vertical sectional view taken approximately on line 11—11 in Fig. 10.

Fig. 12 is a composite view diagrammatically showing relative advancing positions of an attacking plane toward a bomber flying a straight course and the attacking aircraft flying conventional pursuit curves approaching from three different azimuth angles with respect to the line of flight of the bomber, illustrated respectively by the full, dotted, and dot-and-dash lines.

Figure 5:
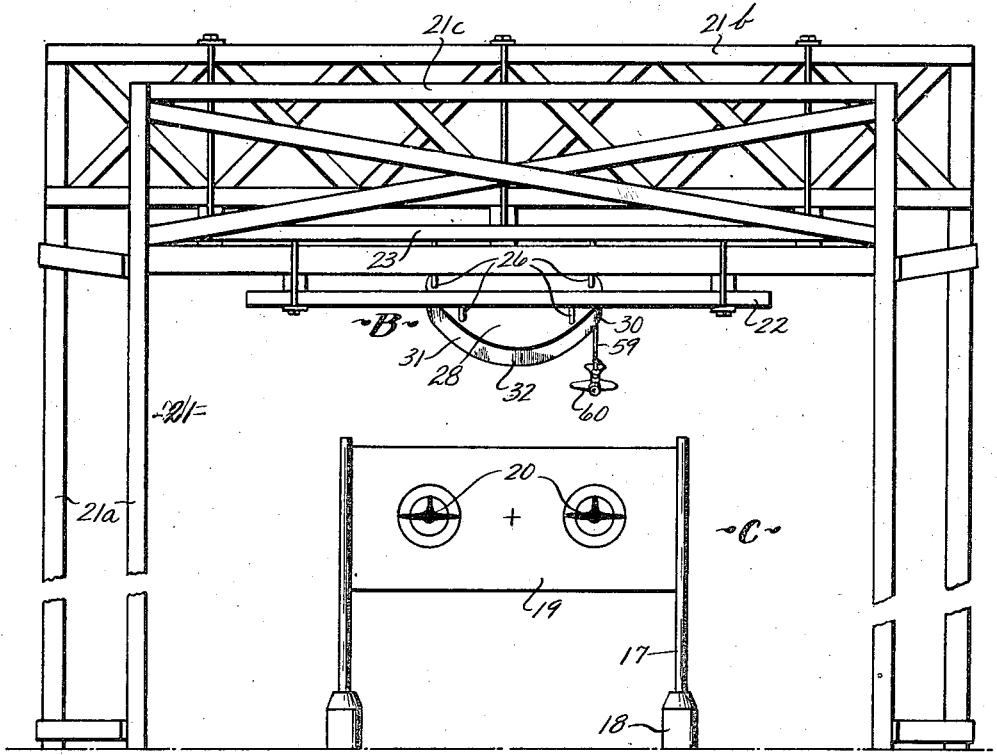
Fig. 5 is an enlarged end view of the sighting target mounting support and sighting target guide frame, looking toward the scoring target, parts of the supporting standards being broken away.

Figs. 13, 13A and 13B illustrate respectively the three curves showing the apparent paths of the simulated pursuit plane as seen by the gunner in the turret on the simulated bomber, due to the manipulation of the turret rotational controls and the sighting target plane movement controls for simulating the attack problems represented by the pursuit curves in Fig. 12, the relative pursuit curves being also shown in full, dotted, and dot-and-dash lines respectively in Figs. 13, 13A and 13B.

Fig. 14 is a diagrammatic view illustrating a modified form of a turret mounting platform in which provision is made for rotating the complete turret assembly in azimuth, and for tilting the complete turret assembly to simulate changes in altitude between the simulated bomber carrying the turret and the simulated pursuit plane, including a wiring diagram illustrating the range instructor's electrical-control station and circuits for selectively rotating the turret mounting means or turntable and tilting the same.

Referring more particularly to Fig. 1 of the drawings, my improved gunnery range comprises a combination of four essential elements consisting of a rotatable support or platform unit as indicated generally at A on which any type of trainable gun or turret may be mounted, a suitable sighting target unit as indicated generally at B, located above or out of the line of fire of the guns carried by the turntable 2 the sighting target being preferably movable on an inclined track above the line of fire of the guns, a scoring target unit as indicated generally at C and a control station as indicated generally at D for the gunnery instructor having suitable controls for coordinating the rotational speed of the turntable A with respect to the variably controlled movement of the sighting target of the sighting target unit B toward the turret axis.

The turntable unit A, as somewhat diagrammatically disclosed in Fig. 1, comprises a fixed base 1 having a rotatable support or turntable 2 mounted thereon to rotate in a plane, preferably horizontal about a fixed axis. A conventional variable speed motor 3, preferably of the "Amplidyne" type, is fixedly mounted on the base 1, having suitable reduction gearing 4 with a drive pinion 4a finally meshing with a ring gear 5 carried on the peripheral portion of the turntable 2.

The turntable 2 is adapted to have any type of flexible gun mounted thereon for swinging movements in azimuth and in elevation, but as shown in Fig. 1, a complete aircraft gun turret and turret supporting structure 6 is mounted on the turntable, including the rotatable turret head 7 containing a pair of aircraft machine guns 8 of any suitable caliber. The turret head is diagrammatically shown as being power operated, having the conventional variable speed azimuth drive motor 9 for rotating the turret in the conventional manner through a suitable reduction gear train as indicated at 10. Direction and rate of rotation of the motor 9 and the turret head are under the control of a gunner within the turret 7 in the conventional manner such as by a control handle 11 conveniently located within the turret for manipulation by the gunner. This control rotates the guns and turret in azimuth, and suitable conventional power means may also be provided for moving the guns in elevation under gunner control such as a variable speed motor 12 having a worm meshing with a segmental rack fixedly carried by the pivoted gun support 13. The sighting means for the guns 8 may be of any conventional type such as in common use in aircraft turrets, such as collimating optical sights or even computing sights, but for purposes of illustration, a simple machine gun open sight is disclosed, indicated generally at 14, having the usual front bead 15 and the conventional multiple rear circular grid sight panel or frame 16. This sighting means 14 is elevated in a predetermined inclined plane with respect to the bores or line of fire of the guns for reasons later to be set forth.

The scoring target unit C is placed at any convenient distance radially away from the axis of rotation of the turntable 2, preferably at a distance of about 1000 inches and comprises a pair of vertical posts or standards 17, removably socketed in socketed fixed concrete base members 18 disposed in spaced relation to each other in a perpendicular plane at right angles to a line passing through the turntable axis and through a point midway between the two base members, so that when the turret guns 8 are directed toward the scoring target parallel to said line, their normal bullet dispersement or line or fire will pass between the two supporting posts 17, in spaced relation to the posts. A bullet scoring target proper, formed of sheet material, is indicated at 19 in Figs. 1, 2, 3 and 5, and extends between the two posts 17 having horizontally spaced bull's-eyes 20 delineated thereon with a horizontal spacing equal to the distance between the lines of fire of the two guns 8, so that the guns, when disposed at a proper elevation, preferably horizontal and the sighting means is properly sighted on the sighting target, will center on the respective bull's-eyes 20 of the scoring target 19.

The sighting target unit B, as best seen in Figs. 1 to 3 and 5 to 11, is mounted the line of fire from the trainable gun or guns 8 carried by the turntable when the guns are centered on the scoring target bull's-eyes 20. The line of sight of the sighting means for the guns 8 is inclined upwardly and outwardly from the turret axis with respect to the line of fire of the guns when properly trained on scoring target bull's-eyes 20, as before set forth, and the movable sighting target proper, later to be described, is disposed in this inclined sighting axis or plane.

Figure 6:
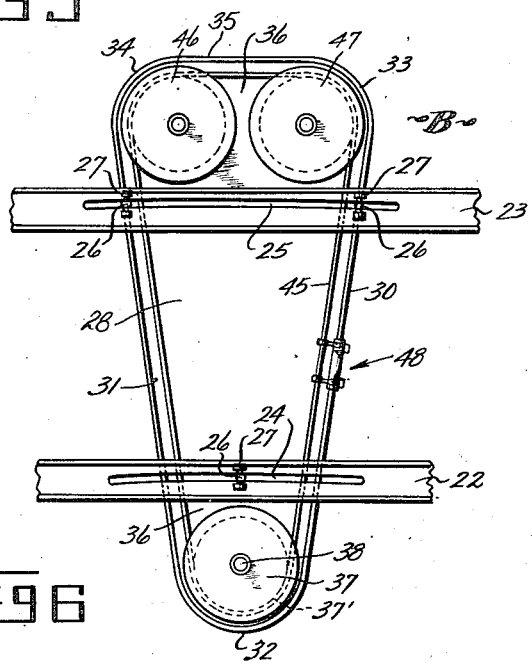
Fig. 6 is a fragmentary sectional view taken on a plane above the sighting target guide frame and above the slotted supporting channels, looking downwardly toward the sighting target guide frame.

Referring to Fig. 5, the sighting target unit B includes a suitable supporting structure indicated generally at 21, straddling the line of fire of the guns on the scoring target recording structure. This supporting structure 21 includes standards or posts 21a to which are connected the horizontal trussed supports 21b and 21c, each carrying one of the guide rails 22 and 23. These guide rails, as best seen in Fig. 6, are each formed with longitudinal arcuate slots therein, as indicated at 24 and 25, to receive vertical hangar rods 26 therethrough for carrying the triangular-shaped sighting frame later referred to. The upper ends of the vertical hangar rods, each have a roller carriage 27 secured thereto, riding on the upper face of the guide rails or supporting channels 23 and 22. The sighting target frame 28 is fixedly secured to the lower ends of the hangars 26 in an inclined plane, parallel to the line of sight of the gun sighting means, and above this line of sight, when the line of fire of the guns is in registration with the scoring target bull's-eyes.

The triangular sighting target frame 28 comprises an endless track member indicated generally at 29, best seen in Figs. 6 to 9, the track member having its opposite sides 30 and 31 straight and diverging outwardly away from the turntable axis at a slight angle. An intermediate curved end portion of the track is indicated at 32, between the ends of the two straight side portions 30 and 31 of the track, adjacent the turntable and while the opposite ends of the two straight portions of the tracks curve toward each other as indicated at 33, 34 with a straight track portion 35 between these two curved portions 33, 34.

Supporting plates or web members 36 extend across the sighting frame 28 between the opposite interior faces of the guide tracks 29 and a large driving pulley 37 is fixed on a vertical shaft 38, rotatably journaled in an upper bearing, carried by the web or plate 36, adjacent the end of the sighting frame nearest to the turntable unit A. The shaft 38 as best seen in Fig. 7 is also journaled in a lower bearing carried by a bracket 39, depending from the face of the plate 36, the shaft 38 having a drive gear 40 fixed thereon, disposed in meshing relation with a smaller drive gear 42, carried by the variable speed electric operating motor assembly which is also secured to the frame plate 36.

The operating motor assembly is preferably in the form of a unit including a variable speed motor 43 of the "Amplidyne" type, in order that the speed of the motor can be accurately adjusted, a reduction gear casing 44 having a reduction gear train therein for driving the pinion gear 42 from the motor at a comparatively low speed.

The drive pulley 37 has a cable groove 37a formed in the periphery thereof for receiving a sighting target actuating endless cable 45. Spaced grooved idler pulleys 46 and 47 are journaled on the sighting frame plate 36 at the opposite end thereof for holding the sighting target operating cable 45 in taut relation, adjacent the inner face of the guide track 29. This arrangement can best be seen in Figures 6, 7, and 9.

A sighting target supporting carriage 48, best seen in Figs. 8 and 9, is mounted for movement along the endless track 29, and comprises upper and lower vertical partially overlapping plate members 49 and 50, each having a pair of grooved guide rollers 51 and 52, respectively, journaled thereon for engagement with the upper and lower edges of the track member 29. The two plates 49 and 50 of the carriage 48 being disposed in overlapping relation, the upper one of the plates carries a plurality of headed projections 53 extending through slots or elongated notches 54 formed in the upper edge portion of the other plate member providing for vertical movement between the two plate members and maintaining the same in juxtaposed sliding relation. Bracket members 55 and 56, projecting from the upper and lower edges of the respective plate members 49 and 50, are connected together by tension members or springs 57. These springs urge the two plates toward each other, maintaining the carriage rollers in correct running engagement with the opposite edges of the endless track member 29. A second bracket member 58 projects inwardly below the lower edge of the track 29 having a small elongated tubular sighting target supporting rod or sleeve member depending therefrom below the track 59 for supporting the sighting target 60, the sighting target being pivoted at 61 to the lower end of the tubular support or sleeve member 59.

The sighting target 60 may be of any desired size or configuration, but preferably consists of a small scale model or miniature size enemy airplane and is pivoted on the tubular support 59 with its longitudinal axis disposed parallel to the direction of movement of the carriage on the track. The relative size of this miniature sighting plane 60 to the distance at which it is observed during its approach toward the target is important. During the time that the sighting plane is visible to the gunner operating the guns in the turret on the turntable unit A, the sighting plane should appear to the gunner, approximately the same size as that of a real plane in actual flight attacking on a normal pursuit curve, simulated by the travel of the sighting target plane on the straight reach of the track toward the gunner on the turntable unit and the apparent lateral displacement of the target plane caused by the relative rotation of the turntable unit as the sighting target plane approaches.

The tubular sighting plane support or guide member 59 is slotted adjacent its lower end, as indicated at 62 in Fig. 9, and has a supporting bracket 63 secured thereto, projecting across the slot 62. The bracket 63 carries a slotted lever 64 pivoted thereto, having one end extending into the slot 62, and connected to an actuating rod 65, slidably mounted within the tubular guide member 59 for vertical movement. The upper end of the actuating rod 65 has secured thereon a U-shaped roller support 66, carrying a grooved roller 67, normally urged upwardly by a coil spring 68, disposed on the actuating rod 65 between the bracket 58 on the carriage and the U-shaped roller support 66.

Vertical actuation of the roller 67 actuates the rod 65 vertically within the tubular support 59, which in turn rocks the lever 64 about its slotted pivotal connection on the bracket 63. The outer or free end of the lever 64 has a link member 69 pivoted at one end thereto, the other end of the link member 69 being pivotally connected to the sighting target plane 60 at some point offset from its pivotal center 61, the connection being preferably connected to an eye projecting from one of the wings of the sighting target plane.

A maneuver track 70 for changing the attitude of the target sighting plane is provided, being adjustably secured to the carriage track 29 in the plane of vertical movement of the pulley 67, the vertically adjusted position of this maneuver track determines the attitude of the miniature plane 60 as observed by the gunner. Referring to Fig. 9, it will be observed that the portion of the maneuver track 29, adjacent the curved end 32, is elevated. The miniature plane 60, as it moves onto this curved portion 32 of the main track, will be caused to simulate a banked turn, as it turns out of the sighting vision of the gunner on the turntable unit A.

With reference to Fig. 7 of the drawings, the main track 29 is preferably vertically slotted at intervals along its length as indicated at 71, to receive securing means for the maneuver track in the form of bolts 72, passing through the maneuver track. Adjustment and tightening of these bolts 72 secures the maneuver track in the desired vertical elevation with respect to the lower edge of the main track.

The upper laterally bent edge of the plate 49 of the carriage carries an arm 73 projecting laterally therefrom, having a slotted opening formed therein to receive an upwardly extending headed rod 74 which is secured to the sighting target driving cable 45, forming an operating connection between the cable and the carriage.

In the operation of the invention for a gunnery range problem simulating a substantially head-on attack, or tail end attack by an enemy pursuit plane, reference being made to Figs. 1 and 2 of the drawings, the sighting frame 28 is adjusted so that the direction of the line of movement of the sighting target 60 along the straight portion 30 of the track extends through the axis of rotation of the turntable 2. When the gun sighting means 14 which is associated with the guns on the turntable is adjusted so that when the gunner is sighting on the miniature sighting plane 60, as the target sighting plane moves toward the gunner, the line of fire of the gun or guns on the turntable will be coincident with the centers of the bull's eyes 20 on the scoring target unit C. The sighting target carriage 48 is initially disposed on the far end of the track 29, away from the gunner, and when the motor 43 is started, the sighting target 60 will appear to bank around the far end of the track and then move directly toward the gunner. If the turntable 2 is rotated in one direction or the other, this simulates relative lateral movement of the attacking pursuit plane during the attack. In this adjustment of the sighting frame 28, the gunner is not required to introduce any "lead" when aiming at the sighting target plane so that if he maintains his sights 15—16 on the sighting plane 60 as it moves towards him, the guns 8 on the turntable 2, associated with the sights, will be properly trained on the scoring target member 19.

When a pursuit plane is attacking a bomber at an azimuth angle, off the longitudinal axis of the bomber, when open or non-computing sights are used, it is necessary for the gunner to introduce definite predetermined amounts of "lead" in his sighting calculation in order to hit the attacking plane. In order to simulate these conditions, such as a pursuit plane flying any predetermined pursuit curve and attacking the bomber, the sighting target supporting frame B is adjusted laterally to a predetermined position, such as shown in Fig. 3 of the drawings so that a vertical plane through the straight portion of the track 29 is offset with respect to the axis of rotation of the turntable 2 and with respect to the sighting axis of the gun sighting means 14. In this adjustment, the gunner must use the circular grid members of his sight and estimate the proper degree of lead of lateral deflection of the sighting axis in front of the advancing target plane just as he would in order to hit a plane under actual attacking conditions, which in the present invention would maintain the fire of his guns 8 centered on the scoring target 19.

Fig. 12 of the drawings is a composite view diagrammatically illustrating the relative positions of a bomber flying a straight course as indicated by the arrow, relative to the lines of fire of an attacking pursuit plane in flying pursuit curves, and the courses of an attacking plane, when attacking on pursuit curves from three different predetermined initial angles with respect to the axis of the bomber being indicated at 76, 76' and 76''. The attacking or pursuit plane when firing fixed guns must fly a definite pursuit curve for each azimuth angle of attack somewhat as illustrated in the full, dotted, or dot-and-dash lines 76, 76' and 76'' in Fig. 12 of the drawings in order that the bullets or projectiles fired from the fixed guns on the pursuit plane will hit the bomber.

In Figs. 13, 13A and 13B the same three pursuit curves 76, 76' and 76'' illustrated in Fig. 12 are also indicated by the full lines, dotted line, and the dot-and-dash line and indicated by the reference numerals 76a, 76b and 76c respectively, and represent the apparent paths of the pursuit plane toward the bomber, as viewed by the gunner on the bomber. The simulated pursuit curves of the attacking plane in the gunner range apparatus is effected by combined rates of movement of the target plane 60 toward the axis of the turntable carrying the guns, sighting means, and the gunner, and the rates of rotational movement of the turntable. In other words, variations in the simulated attacks of the pursuit plane and apparent pursuit curves followed by a pursuit plane are effected by varying the rate of rotation of the turntable with respect to the rate of movement of the sighting target toward the turntable axis.

Changes in the simulated speed of travel of the bomber and of the attacking plane are also effected by varying the rate of movement of the target plane along the track and the rate of rotation of the turntable support, these being under the control of an instructor, located at the instructor's station D, which preferably includes a desk having adjustable controls thereon for regulating sighting target and turntable speed, and located adjacent the turntable 2.

Substantially any type of directable or trainable gun or guns may be mounted on the turntable, such as a complete turret and supporting base, as shown somewhat diagrammatically in Fig. 4 of the drawings. These turrets may be of any conventional turret design or construction, such as the upper and lower dual gun turrets of modern bomber aircrafts, also the chin and tail turrets employing conventional guns, such as the 30 or 50 calibre machine guns. It is desirable however to adjust the bores of the guns so that the fire therefrom is substantially parallel to each other if the two bull's-eyes 20 on the scoring target 19 are used.

Since the initial angle of attack of the pursuit plane, as viewed from the bomber, is determined by the relative direction that the guns and sighting axis of the sighting means in the turret is pointed in azimuth with respect to the simulated axis of the bomber when the sights are initially trained on the sighting target, it is necessary that some form of orienting means be used within the turret to inform the gunner of the angular position that the guns are pointed at the target with respect to the simulated longitudinal axis of the bomber. This orienting means may be of any suitable conventional type, as for instance, in the form of a small airplane as shown in Fig. 4 at 103, rotatable in a horizontal plane within the turret, in the gunner's vision, by predetermined relative rotary movement between the turret head 7 and the turret support, and arranged so that the longitudinal axis of this small airplane is shifted by rotative movement of the turret so as to occupy the same angle that the axis of the simulated turret carrying plane occupies with respect to axis of the guns and sighting axis of the gun sighting means.

In the operation of the device as best seen in Fig. 1, an instructor is preferably seated at the control desk of the control unit D and adjusts the control dials 77 and 78, respectively, to set the rate and direction of rotation of the turntable 2, and the rate and direction of movement of the sighting target 60, the relative initial starting position of the turntable 2 having been initially adjusted for the particular angle of simulated attack. The control switch 79 is then closed simultaneously energizing the motor 3 to rotate the turntable support 2, and energizing the motor 43, to cause movement of the target plane 60 along the track 29 toward the gunner. Assuming that the sighting target unit B has been adjusted laterally with respect to the sighting line to introduce a predetermined amount of "lead" in the sighting problem, the gunner within the turret must determine this "lead" in the sighting target 60 as it moves towards him as in actual battle conditions and must operate the conventional azimuth controls in the turret head in the conventional manner, counter-rotating the turret to the turntable to maintain the target airplane 60 in his sights, making allowance for the "lead." Under these conditions, the guns will remain stationary and the line of fire will be concentric on the bull's eyes on the scoring target C and holes in the scoring target 20, formed by bullets fired from the guns in the turret will form a permanent record of the gunner's accuracy. The target plane speed adjusting control 78 is preferably calibrated in seconds of attack duration, and is set by the instructor in accordance with the attack problem presented. The rotating base speed control 77 is also preferably calibrated in degrees of rotation per second and is individually set by the instructor in accordance with the desired rotational base speed for each second of the particular simulated attack in the attack problem. A suitable resistance such as indicated at 80 may be switched into the operating circuits for the turntable unit, and the sighting target, if desired, to reduce the respective speeds of the target plane and turntable to a predetermined amount, such as one-half of the normal speed.

Referring to the modified form of my invention, disclosed in Fig. 14, a fixed supporting base 81 carries spaced upstanding supporting brackets 82, journaled to receive trunnion members 83 projecting from the opposite sides of a tiltable turntable supporting base 84, tiltable on a horizontal axis perpendicular to a straight line midway between the spaced brackets 82, extending through a scoring target such as indicated at 19 in Fig. 1, intermediate the two bull's-eyes thereon. The tiltable supporting base 84 carries a tilting motor 85 having a worm meshing with a segmental rack fixed to one of the supporting brackets 82. The tiltable supporting platform 84 carries a rotatable supporting base or turntable 86 rotatable about a central axis 86' passing through the tilting axis of the tiltable base 84.

As diagrammatically shown in Figure 14 of the drawings, the instructor's station includes adjustable controls 87, 88, and 89 for controlling respectively the tilting of the base 84, the rotation of the turntable base 86, and the movement of the sighting target 90 on the sighting frame of the sighting unit toward the target. The sighting unit is similar to that described with the nontilting base type of apparatus and therefore not shown further in this figure. Each of the circuits 87', 88', and 89' for the respective motors 85, 91, and 92 that control tilt and rotation of the base and movement of the sighting target, includes an adjustable bridge circuit, an operating contact control handle 93 and associated indicia 94, for indicating the relative relation of the bridge circuits and the corresponding speeds of the motors. Individual switches 96 are provided for selectively interrupting the operation of any of these motors. A common energizing control or main switch 97 is interposed between the power supply 98 so that the operating handles 93 may be set to determine the relative rates of tilt of the platform 84, rotation of the base 86 and movement of the sighting target 90 before the main switch 97 is closed.

In this form of the invention, as in the aforementioned nontilting form, any type of directable gun may be mounted on the platform 86, but I have illustrated a conventional turret structure indicated at 99 having a turret head 100 and sighting means 101, associated with conventional turret machine guns 102, the sighting axis of the sighting means being elevated with respect to the bore of the guns 102 to dispose the sighting axis in the plane of movement of the sighting target 90 when the lines of fire of the guns 102 are centered on the bull's-eyes of the scoring targets.

In the operation of this form of the invention, the manipulation of the two controls 93 for rotating the rotary support and advancing the sighting target, as the gunner within the turret 99 aims his guns on the sighting target, causes the pursuit target airplane to appear to be attacking the bomber on a definite pursuit curve. The type of pursuit curve simulated is governed by the relative adjustment of the two right-hand controls 93. Manipulation of the other or left-hand control effects a tilting of the turntable 86, which simulates relative vertical movement or change in altitude between the gunner's position and the attacking enemy aircraft.

If the gunner maintains his sights on the sighting plane 90 as the turret tilts, the line of fire of the guns will remain substantially in register with the bull's-eyes 20 of the scoring target (not shown) in this figure of the drawings. The scoring target may be any fixed target such as that disclosed in connection with the nontilt type of platform previously described.

Inclining the line of movement of the sighting target upwardly and outwardly from the sight and correspondingly elevating the sighting axis of the sighting means for guns with respect to the bore or line of fire of the guns disposes the sighting target in a position where it will be normally outlined against a sky background, and if it is desired to prevent the gunner within the turret from obtaining any orientation from the scoring target below or other stationary parts of the apparatus outside of the turret, the turret head may be covered with a translucent paint or coating not shown, leaving only a relatively small clear sighting area substantially surrounding the sighting axis of the gun sighting means.

Referring again to the orienting means, as shown in Fig. 4, whereby the gunner may orient his turret position in azimuth with respect to the simulated axis of the bomber in order to estimate the attacking angle of the pursuit plane for determining the degree of "lead" that must be introduced, one embodiment might consist of a small airplane 103, mounted on the end of a flexible rod or cable 104 rotatably disposed in a casing 105, the rod or cable 104 having a worm gear 106 secured thereon, meshing with a worm 107 on a shaft 108, rotatably journaled in the turret head 100, having a pinion 109 on its lower end, meshing with a ring gear 110 of the turret supporting structure 99. The gear and worm relations are calculated to maintain the axis of the small orienting airplane 103 in a fixed relation with the turret support 99 representing the body of the bomber.

Additional orienting means are provided which may be used if desired, as shown in dotted lines in Fig. 4 and indicated at 111. This is in the form of a partial "mock-up" of the body or wing structure of the simulated bomber. In this figure the wings only are indicated at 111 with the outer portions thereof broken away.

If sufficient vision out of the turret is provided around the gun sighting axis to enable the gunner to see the wings 111, the gunner is enabled to orient his sighting axis and direction of his guns with respect to the simulated axis of the bomber by his observation of the relative position of the "wings" 111.

While open sights are illustrated, it is obvious that the modern optical sights may be used with the apparatus, it being necessary only to elevate the sighting axis while the guns are "bore sighted" on the respective target bull's-eyes so that the sighting axis is in registration with the sighting target while the guns register with the scoring target.

Suitable limit switches are preferably provided for limiting the relative degree of rotation of the turret head, so as to prevent the guns from being pointed at too great an angle on either side of a line from the turret axis to the scoring target.

Having thus described my invention what I claim as new and desire to secure by Letters Patent of the United States is:

1. In an aircraft gunnery practice range, a rotary support disposed to rotate about a substantially fixed vertical axis, a fixed scoring target, a sighting target movably disposed above said rotary support at one side of the said vertical axis to move in a predetermined path in a vertical plane extending substantially radially toward said vertical axis, adjustable control means for controlling the rate of rotation of said rotary support about said vertical axis and adjustably controlling the rate of movement of the sighting target toward said rotary support, and a gun mounted on said rotary support to swing in azimuth substantially about the aforesaid vertical axis independently of rotation of the rotary support and in elevation, said gun having sighting means thereon with a sighting axis disposed in registration with the sighting target when the axis of the gun is in registration with said scoring target.

2. In a practice range for aircraft gunnery, a rotary support, a conventional aircraft turret mounted thereon for independent rotation about an axis concentric with the rotary axis of the support and containing guns disposed to rotate with the turret in azimuth and adjustable in elevation, together with gun sighting means for said turret guns having a sighting axis disposed in a plane inclined with respect to the line of fire of said guns, sighting target means disposed to move toward said sighting means from a predetermined spaced position away from said turret axis, in a plane coincident with the said inclined plane of the said sighting axis when said turret guns are in a predetermined substantially horizontal plane, a fixed scoring target mounted in front of said turret guns when in the aforesaid substantially horizontal position, having bull's-eye scoring means thereon disposed in registration with the lines of fire of the turret guns when said sighting axis of the sighting means is in alignment with said sighting target means, means for rotating said rotary support to rotate the turret therewith to angularly displace the sighting axis of the sighting means and the line of fire of said turret guns in azimuth relatively with respect to said sighting target means and said bull's-eye scoring means on the scoring target and means for moving said sighting target means in said inclined plane toward said gun sighting means.

3. In a gunnery practice range, a rotary gun support rotatable about a vertical axis, a remote fixed scoring target, a sighting target spaced from the rotary gun support and movable in a vertical plane located between the rotary support axis and the scoring target, said rotary support having a flexible gun mounted thereon to swing in elevation and in azimuth independently of rotary movement of the rotary support, said gun having preadjusted sighting means thereon determining the line of fire of the gun on said fixed scoring target when the gun is aimed at said sighting target, said sighting target being located at a different elevation from that of the fixed scoring target and movable in the sighting axis when the guns are trained on the scoring target, power means for moving the sighting target in said vertical plane and sighting axis toward the gun sighting means and toward the axis of rotation of the rotary gun support, manual control means for operating said power means to predetermining the rate of movement toward the turret of the sighting target means, power means for rotating the rotary gun support about its axis, and manually operable control means for the said rotary support power means for controlling the rate of rotation of the rotary support.

4. In a gunnery practice range, a rotary gun support, a fixed scoring target, a sighting target movable toward the rotary support in a vertical plane extending between the rotary support and the scoring target, a flexible conventional gun mounted on the rotary support to swing in elevation and in azimuth independently of rotary movement of the rotary support, said gun having sighting means movable therewith and adjusted to determine the line of fire of the gun on said fixed scoring target when the gun is aimed at said sighting target, means for guiding said sighting target downwardly in an inclined plane toward the rotary gun support axis, said sighting target being at a different elevation from a line from the gun to the fixed scoring target, power means for moving the sighting target in said inclined plane toward the gun sighting means, manual control means for operating said power means to predetermining the rate of movement of the sighting target means toward the gun sighting means, power means for rotating the rotary gun support independently of sighting target movement, and manually operable control means for the said rotary support power means for controlling the rate and direction of the rotary support.

5. In a practice range for simulating the predetermined flight movement of a pursuit aircraft when viewed from a bomber and attacking the bomber, a rotary supporting platform simulating the bomber, a gun flexibly mounted on the platform for training movements in azimuth and in elevation independently of the rotation of the platform and displaceable in azimuth by rotation of the platform, sighting means fixed with respect to the gun with the sighting axis thereof inclined upwardly above the line of fire of the gun, a stationary scoring target remotely located at one side of the rotary axis of the platform in the line of fire of the gun when the gun is pointed in a predetermined position in azimuth and elevation, an inclined sighting target guide support disposed in closer proximity to the gun than the scoring target and located above and parallel to the inclined sighting axis of the gun sighting means when the line of fire of the guns is in registration with the scoring target, a sighting target airplane simulating the pursuit aircraft, movably guided by the inclined sighting target guiding support to move between predetermined spaced points in the sighting axis of the gun sighting means when the line of fire of the gun is in registration with the scoring target, simulating the relative movement of the pursuit aircraft toward the bomber, manually adjustable means for controlling the rotation of the platform with respect to the sighting and scoring targets at predetermined rates, and separate manually controlled means for controlling the position and rate of movement of the sighting target on the sighting target guide means toward the platform axis, whereby during continued rotation of the platform and movement of the sighting target airplane toward the platform, if the gun sighting means is aimed at the sighting target airplane and the guns are fired, the gunner's accuracy in aiming at the sighting target airplane will be recorded by gun fire registering on the scoring target.

6. In a gunnery range for simulating the attack of a pursuit aircraft on a bomber in flight at predetermined azimuth angles, a fixed support, a rotary platform carried thereby simulating the bomber and disposed to rotate about a fixed vertical axis, manually controllable power means for rotating the platform at predetermined rates and in predetermined directions, an elongated sighting target guide frame mounted above the platform in spaced relation thereto at one side of the platform axis, having a straight guide portion radially inclined away from the platform axis, a sighting target movably carried by the guide frame to move along said straight guide portion between predetermined points on the guide frame in parallel relation to the guide frame and toward the rotary axis of the platform, manually adjustable power means for moving the sighting target between said predetermined points on the guide portion at predetermined rates of speed, a stationary scoring target mounted at one side of the platform at a substantially greater distance therefrom than the sighting target guide frame and at a lower elevation than the sighting target, said scoring target being disposed in a line extending radially away from the axis of the platform with the surface of the scoring target positioned at right angles to the last mentioned line, a flexible gun mounted on the rotary platform and trainable independently of platform motion having sights elevated in coincidence with the line of movement of the sighting target while on the guide frame straight portion, with the gun pointed in registration with the center of the scoring target, whereby a gunner aiming through the gun sighting means at the sighting target, during movement thereof toward the platform axis and rotation of the platform, will record hits on the scoring target when the gun is fired.

7. In an aircraft flexible gunnery practice range, a rotary gun support having a flexible gun mounted thereon, a vertical stationary scoring target, means for rotating the gun support about a vertical axis remote from and substantially parallel to the vertical plane of the stationary scoring target, manual control means for predetermining the rate of rotation and direction of rotation of the rotary gun support, said gun being mounted on the rotary gun support for training movements in elevation and in azimuth independently of the rotation of the rotary gun support, and sighting means carried by the gun having a preadjusted elevated sighting axis passing substantially through the axis of rotation of the rotary gun support and inclined upwardly and away from the gun support axis in a plane passing above the scoring target when the gun is pointed in registration with the center of the scoring target, a movable sighting target airplane disposed to move downwardly toward the rotary axis of the rotary gun support in the sighting line of the gun sighting means when the gun is centered on the scoring target, power means for moving the sighting target in said inclined plane and manually adjustable means for controlling the sighting target power means to predetermine the relative rate of movement of the sighting target in the sighting axis toward the support axis during the rotation of the gun support whereby the gun may be fired by a gunner aiming at the sighting target airplane during movement thereof toward the gunner and rotation of the rotary gun support and the gunner's accuracy will be recorded on the stationary scoring target.

8. In an aircraft gunnery practice range for simulating the relative flight movement between a bomber having a turret and guns therein and an attacking aircraft flying a predetermined pursuit curve toward the bomber, a rotary platform simulating the bomber having a conventional aircraft turret structure centered thereon, having guns therein adapted to be trained and fired by a gunner within the turret in azimuth and in elevation independently of rotative movement of the platform, preadjusted sighting means for the guns having the sighting axis thereof diverging upwardly at a predetermined angle from the line of fire of the guns when trained in a predetermined direction, power means for rotating the platform and the turret structure together in azimuth, adjustable manual control means for predetermining the relative rate and rotation of the platform to simulate the relative lateral displacement of the attacking aircraft when approaching the bomber on predetermined pursuit curves, a miniature sighting target airplane simulating the attacking pursuit plane, guide means for guiding the sighting target plane for movement in the sighting axis toward the rotary axis of the platform when the guns are trained in said predetermined direction, and a scoring target having bull's-eyes disposed in registration with the line of fire of the guns when the guns are fired while trained in said predetermined direction for registering the gunner's accuracy in aiming the guns at said sighting target.

9. In an aircraft gunnery practice range for simulating a bomber in flight and a pursuit plane attacking the bomber at predetermined speeds and predetermined angles, a rotary support simulating the bomber and rotatable on a substantially vertical axis, a conventional aircraft turret concentrically mounted on the rotary support for rotation with and independent of the rotation of the rotary support, real conventional guns carried by the turret and mounted thereon to rotate with the turret in azimuth and adjustable in elevation, gun sighting means within the turret operatively associated with the guns, having the target sighting axis thereof elevated at a predetermined angle with respect to the line of fire of the guns, conventional control means within the turret for rotating the turret and training the guns, separate control means mounted exteriorly of the confines of the rotary support for controlling the rate and direction of rotation of the rotary support to simulate predetermined lateral displacements of the pursuit plane as viewed by a gunner in the turret when the pursuit plane is attacking the bomber, a sighting target guide frame inclining upwardly and outwardly away from the axis of rotation of the turret and rotary support and located above the elevated sighting axis of the gun sighting means in parallel relation thereto when the guns are trained at a predetermined elevation and in a predetermined direction in azimuth, said guide frame comprising an elongated substantially straight guide track portion extending in a substantially radial direction from the rotary support and turret axis and in parallel relation to and above the inclined sighting axis of the gun sighting means when the guns are trained in said last mentioned predetermined azimuth and elevation direction, said straight track portion having its opposite ends curved laterally in the same direction, a sighting target carriage mounted on said guide track to travel from the curved end thereof farthest away from the plaform axis, along the substantially straight portion of the track and onto the other curved end thereof, power means for moving the carriage along the track, manually controllable means for the power means located beyond the confines of the rotary support for determining the speed of said carriage along said track toward the turret, a sighting target airplane simulating as attacking pursuit plane depending from said carriage in the predetermined inclined plane of the gun sighting means when the guns are trained in the said predetermined direction, said sighting target airplane having a size relative to the distance between the same and the gun sighting means which is proportional to the size of a full sized airplane when viewed by a gunner within the turret at normal combat range, whereby the movement of the miniature target airplane along the sighting axis simulates the approach of a pursuit airplane toward the bomber and rotation of the platform tends to displace the sighting axis laterally with respect to the approaching simulated pursuit plane to simulate the pursuit curve flown by the pursuit plane, and a stationary scoring target positioned below the line of sight to the target airplane and in predetermined spaced relation to the rotary support axis in the line of fire of the turret guns when the guns are pointing in said predetermined direction and the sights are in alignment with the sighting target airplane, to record the accuracy of the gunner when the guns are discharged by a gunner within the turret during the time that the gunner is aiming at the sighting target airplane.

10. Apparatus as claimed in claim 9, including means for adjusting the sighting target guide frame laterally to offset the approach direction of said substantially straight movement of the miniature target sighting plane on the substantially straight track portion toward the turret axis with respect to the sighting axis of the gun sighting means when the guns are trained on the scoring target, whereby the gunner, when aiming the guns at the sighting target, must offset his line of sight to introduce predetermined allowances for "lead" in the sighting calculation in order to center the line of fire of the guns on the scoring targets.

11. Apparatus as claimed in claim 9, including means for tilting the rotary support to elevate or depress the gun and its sighting means with respect to the sighting target airplane, in a vertical plane extending through the scoring target, for simulating vertical movement or change in altitude between the gunner and the sighting target airplane when the rotary support is tilted.

12. Apparatus as claimed in claim 9, including direction of attack indicating means within the turret operable by relative angular rotation between the turret and said rotary support, to indicate the relative azimuth angular displacement between the direction the turret guns are pointed and the simulated axis of the bomber, from a predetermined initial parallel relation, whereby the angular relation of the guns in the turret with respect to the simulated direction of flight movement of the bomber relative to the movement of the sighting target can be determined by a gunner in the turret, so that the gunner can determine the simulated angle of attack of the attacking plane.

13. In an aircraft gunnery practice range for training aircraft turret gunners to aim and fire turret guns at enemy aircraft attacking on predetermined approach or pursuit curves, a stationary support, an instructor's control station, a rotary turret supporting platform carried by said stationary support for rotation about a substantially vertical axis adjacent said instructor's station, power means connected between the stationary and rotary supports for rotating the latter, manually operable control means at said instructor's station to predetermine the relative rate of rotation of the rotary support, and an aircraft turret mounted on the rotary support having conventional guns and gun sighting means having a sighting axis elevated at a predetermined angle above the line of fire of the guns, a stationary gun fire scoring target located at a predetermined distance from the rotary support axis having scoring bull's-eyes thereon, an elongated sighting target guide frame adjustably fixed above the rotary platform at one side of the vertical axis having a straight guide portion positioned substantially in a vertical plane extending between the rotary support axis and the scoring target, said straight guide portion inclining upwardly away from the rotary support in a vertical plane passing substantially through the center of the scoring target and the rotary support axis, a sighting target simulating the enemy aircraft comprising a miniature model of a simulated attacking aircraft mounted to travel on said guide means toward said platform axis in a vertical plane in the sighting axis of the gun sighting means when the guns are pointed at the scoring target bull's-eyes, power means carried by said guide frame connected to the sighting target to move the same along said guide means, manually operable control means located at said instructor's station for controlling the operation of said last-mentioned power means to determine the rate of movement of said sighting target toward the platform axis, in combination with a conventional power operated aircraft gun turret and supporting structure bodily mounted on said rotary platform having a gun turret mounted for independent rotation under control of a gunner within the turret, conventional guns within the turret movable with the turret in azimuth and trainable in elevation, and sighting means for the guns preadjusted to lie in the line of movement of the sighting target toward the platform axis when the line of fire of the guns is centered on the scoring target bull's-eyes.

14. Apparatus as claimed in claim 13 including gun turret rotation limiting means operatively disposed between the gun turret and the stationary support, for limiting the degree of rotation of the turret to limit the degree angular displacement of the guns in azimuth at opposite sides of the scoring target and the sighting target.

15. Apparatus as claimed in claim 13, in which said sighting target means comprises a laterally adjustable elongated supporting frame, having an endless somewhat triangular shaped guide track fixed thereon, with one reach of the track extending substantially straight in parallel relation to the gun sighting axis when the gun is trained on the scoring target, a sighting target supporting carriage mounted to travel along said track, around said frame, manually controlled power means on said frame for moving said carriage along said track at predetermined rates of speed, and said sighting target is a miniature sighting target model airplane pivotally depending from said carriage to travel below said track in the plane of said sighting axis of the gun sighting means when said gun is trained on said scoring target, adjustable laterally with said frame to move in a vertical plane angularly disposed with respect to a vertical plane passing through the sighting axis when the gun is trained on the scoring target.

16. Apparatus as claimed in claim 13 in which said sighting target includes an elongated triangular shaped laterally adjustable frame having an endless triangular shaped guide track extending therearound, inclined to lie in an inclined plane parallel to the gun sighting axis when the gun is trained on the scoring target, said track having opposite straight reaches and curved portions connecting the said straight reaches, one reach of the track being arranged to be on a line substantially parallel to said sighting axis, whereby laterally adjustable with the frame disposes the last mentioned reach of the track in predetermined offset angular relation in azimuth to the sighting axis, a carriage mounted to travel around said track, manually controllable power means between said carriage and said frame for moving the carriage at predetermined rates along the track and said reach, toward said gun sighting means, said miniature sighting target being dependingly supported from said carriage in the said inclined plane of said gun sighting means, when the gun is trained on the scoring target.

17. In an aircraft flexible gunnery practice range, a rotary gun support, mounted to rotate about a fixed vertical axis, a stationary scoring target mounted at a predetermined distance from said rotary gun support, manually controllable means for rotating said rotary gun support at predetermined rates about said vertical axis with respect to the stationary scoring target, laterally adjustable elongated triangular shaped sighting target carrying frame means, inclining upwardly away from the rotary gun support axis, at a predetermined elevation above said rotary gun support, in a vertical plane passing substantially through said rotary support axis and the center of said scoring target, an endless guide track extending around said frame having triangularly disposed straight sides and intermediate curved connecting portions, a carriage mounted to travel around said track, a model sighting target airplane, tiltably carried by said carriage in depending relation below the track, to move in spaced parallel relation to the track, an endless sighting target attitude changing track for tilting said sighting target airplane to change the attitude thereof, said attitude changing track being adjustably carried on said target carrying frame adjacent said guide track, sighting target tilting means on said carriage connected at one end to said target airplane in offset relation to the tilting supporting center thereof, and engageable with said target attitude adjusting track at the other end during carriage movement along the track to be actuated by the contour of the attitude changing track, cable guide pulley means carried on said triangular shaped sighting target carrying frame at the intermediate connecting curved portions thereof, manually adjustable power means for driving one of said cable guide pulley means, endless cable means tensioned around said cable guide pulley means to lie adjacent said guide track in substantially parallel relation thereto, an operating connection between said endless cable means and said carriage, a flexibly mounted gun having relatively fixed sighting means, mounted on said rotary gun support with the line of fire of the gun trained on the center of the scoring target and the sighting axis of the gun sighting means elevated and positioned to lie in the line of travel of said model sighting target plane, whereby rotation of the rotary gun support by said power means, and movement of said carriage along said track, causing movement of said miniature sighting target plane toward said gun sighting means, simulates an attack on the aircraft carrying the gun by the pursuit aircraft flying a predetermined pursuit curve, when the model sighting target plane is observed by the gunner on the platform through said sighting gun means so that when the guns are fired, the degree of sighting accuracy of the gunner in aiming at the sighting target plane is determined by the gun fire on the scoring target.

FRED S. POORMAN.

REFERENCES CITED

The following references are of record in the file of this patent:

UNITED STATES PATENTS

| Number | Name | Date |
| --- | --- | --- |
| 1,342,871 | Ruggles | June 8, 1920 |
| 2,283,922 | Fischer | May 26, 1942 |
| 2,294,408 | Karnes | Sept. 1, 1942 |
| 2,335,257 | Binks | Nov. 30, 1943 |
| 2,364,070 | Haile | Dec. 5, 1944 |
| 2,364,720 | Jones | Dec. 12, 1944 |
| 2,375,004 | Knowles | May 1, 1945 |
| 2,382,777 | Dahlberg | Aug. 14, 1945 |
| 2,387,153 | Johnson | Oct. 16, 1945 |
| 2,387,749 | Darnell | Oct. 30, 1945 |
| 2,392,142 | Gossweiler | Jan. 1, 1946 |

FOREIGN PATENTS

| Number | Country | Date |
| --- | --- | --- |
| 290,383 | Great Britain | May 17, 1928 |
| 332,403 | Italy | Nov. 29, 1935 |
| 602,622 | Germany | Aug. 15, 1936 |